Jan. 20, 1931. M. H. ROBERTS 1,789,691
BOOSTER EQUIPMENT FOR LOCOMOTIVES
Filed Oct. 13, 1928 3 Sheets-Sheet 1
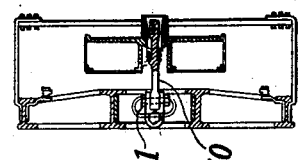
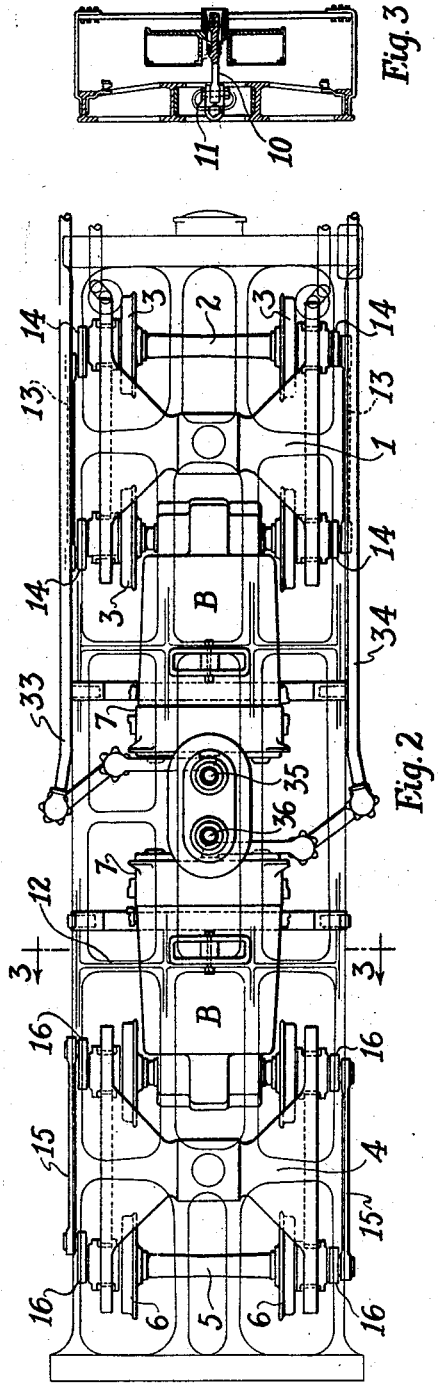
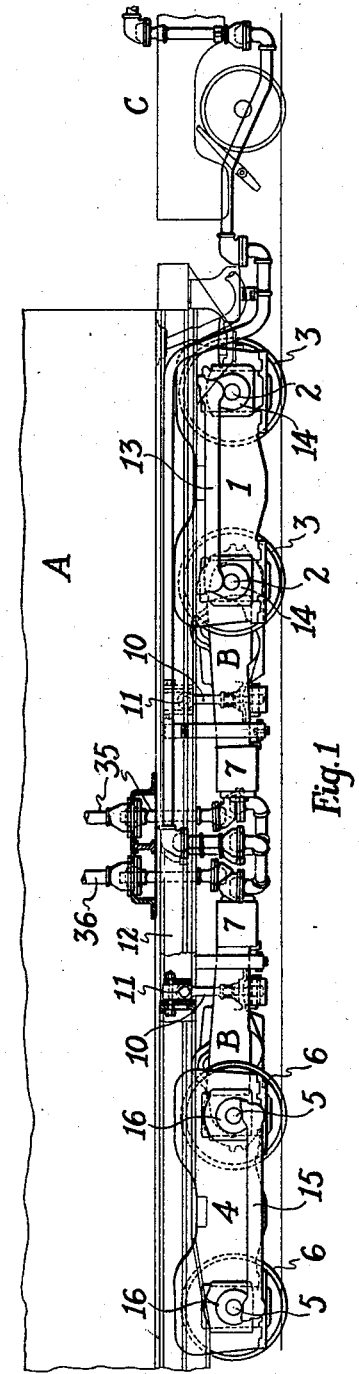
INVENTOR
Montague H. Roberts
BY
ATTORNEYS

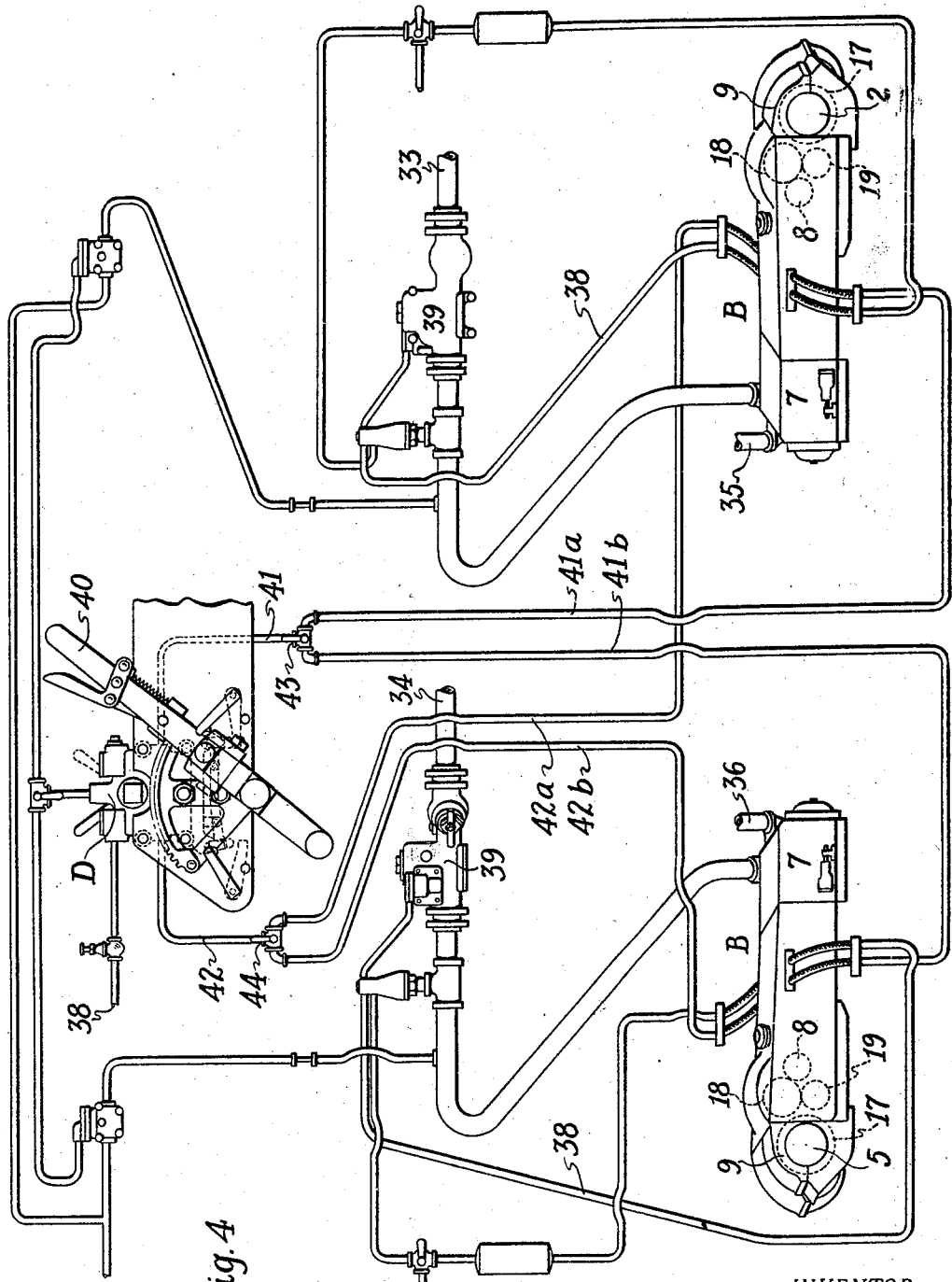

Jan. 20, 1931.  M. H. ROBERTS  1,789,691
BOOSTER EQUIPMENT FOR LOCOMOTIVES
Filed Oct. 13, 1928  3 Sheets-Sheet 3

INVENTOR
Montague H. Roberts
BY
Synnestvedt & Lechner
ATTORNEYS

Patented Jan. 20, 1931

1,789,691

UNITED STATES PATENT OFFICE

MONTAGUE H. ROBERTS, OF ENGLEWOOD, NEW JERSEY, ASSIGNOR TO FRANKLIN RAILWAY SUPPLY COMPANY, OF NEW YORK, N. Y., A CORPORATION OF DELAWARE

BOOSTER EQUIPMENT FOR LOCOMOTIVES

Application filed October 13, 1928. Serial No. 312,265.

This invention relates to locomotive booster apparatus and is particularly applicable to locomotive tenders, although the invention might be applied in other locations, either on the locomotive itself, or on some adjacent car in the train.

The principal object of the invention is to materially increase the starting and slow speed power of the locomotive so as to enable it to handle longer trains, and in connection with the foregoing it is a part of the invention to provide this increased power in either direction of travel.

More specifically considered, it is an object of the invention to make use of the tender load to increase the tractive power, and to this end I arrange to make use of all of the tender wheels for driving purposes, as well as for load carrying purposes.

Another object of the invention is to provide a booster equipment for the purpose specified which will be sufficiently compact to fit into the limited space available in situations of the character to be described hereinafter.

Other objects and advantages of the invention will appear hereinafter as the description proceeds.

The accompanying drawings illustrate a preferred embodiment of the invention, Fig. 1 being a partial side elevation of a tender and the rear end of its locomotive showing my improvements applied thereto.

Fig. 2 is a plan view of the tender shown in Fig. 1 with the tank portion of the tender removed for the sake of clearness.

Fig. 3 is a section on the line 3—3 of Fig. 2.

Fig. 4 is a diagrammatic layout of my improved booster equipment showing the various connections of the operating or controlling mechanism therefor.

Figure 5:
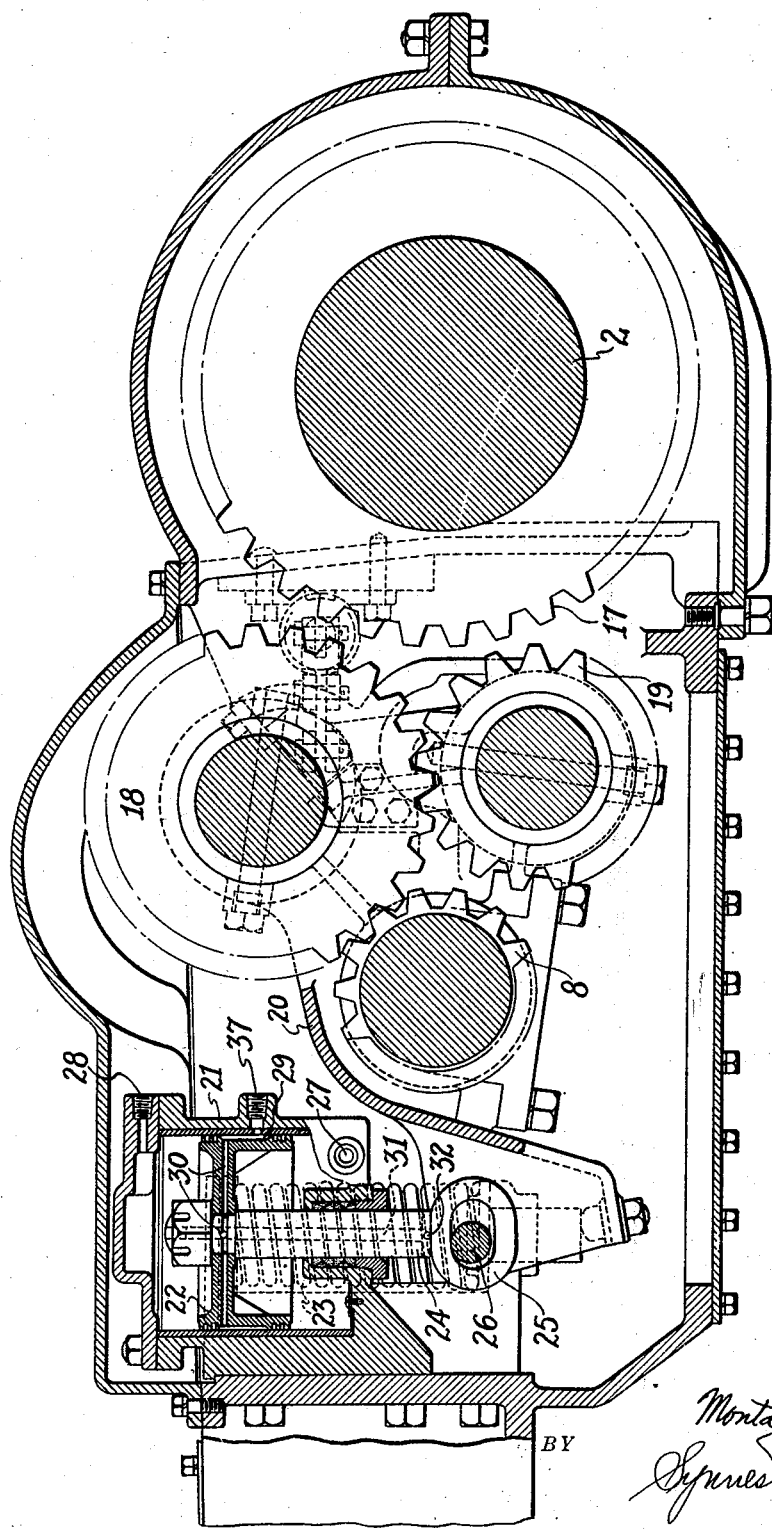
Fig. 5 is an enlarged vertical section longitudinally of one of the booster motors, but showing only the end of the booster motor which is connected to the axle which it drives.

From these drawings it will be seen that the tender A is equipped with a pair of booster motors B which are arranged in the following manner. The tender is provided with a forward truck 1 having a pair of axles 2 with their wheels 3. It is also provided with a similar truck 4 at the rear having axles 5 and wheels 6. The rear end of the locomotive C appears at the right of Fig. 1.

The boosters B are of the general type now well known in the art having cylinders 7 at one end and a driving pinion 8 at the other, the pinion being driven by the reciprocation of the pistons in the cylinders 7.

One end of each booster is constructed with suitable bearings 9 adapted to embrace the axle which it is intended to drive. This end of the booster is, therefore, carried on the axle, the booster extending outwardly away from the axle in the usual manner and being supported at a point remote from the axle by means of a hanger 10 pivoted at 11 at some suitable point on the tender frame 12.

It will be seen that the forward booster B is arranged to drive the rear axle 2 of the forward truck 1 and extends rearwardly therefrom toward the rear truck, so that its cylinders 7 are brought approximately to a point just short of the center of the tender, and that the rear booster is oppositely disposed with its driving end mounted upon the forward axle 5 of the rear truck 4 and with its cylinders 7 projected forwardly toward the forward truck so that the two pairs of cylinders are adjacent to each other at a point substantially beneath the center of the tender.

The axles 2 of the forward truck are coupled together by means of the connecting rod 13 and cranks 14, while the rear axles 5 are similarly connected by the connecting rod 15 and cranks 16. It will thus be seen that all of the wheels of the tender are arranged to aid in driving the locomotive, as well as to carry the load of the tender. By this means I am enabled to greatly increase the tractive power of the locomotive which will enable me to start much heavier trains and to keep them in motion at slow speeds up heavy grades.

I prefer to use uni-directional booster motors, although this is not absolutely essential. In motors of this kind the actual rotation of the booster parts is never reversed, the steam being supplied at all times in one direction. Reversal of the booster or of its driving function is accomplished by means of suitable idler gearing which will be briefly described, but which is more fully illustrated and claimed in the patent of Roberts and Forker, No. 1,686,710 issued on October 9, 1928.

Particular reference should now be made to Fig. 5, which illustrates the forward end of the forward booster. On the axle 2 is mounted a large driven gear 17. Between the driving pinion 8 and the driven gear 17 is mounted an idler gear 18 which is always in mesh with the driving pinion 8, but normally out of mesh with the gear 17 when the booster is not being operated. In constant mesh with the idler gear 18 is a second idler gear 19 which also is normally out of mesh with the gear 17 when the booster is not in operation.

The two idler gears 18 and 19 are mounted upon a rocking member 20 which is adapted to swing about the axis of the driving pinion. Motion of this rocking member 20 in a clockwise direction will mesh the idler gear 18 with the gear 17 and drive the axle 2 in one direction, while counterclockwise motion of the member 20 will bring the smaller idler gear 19 into mesh with the gear 17 in order to drive the axle 2 in the opposite direction.

The rocker 20 is operated or moved by means of a small motor device comprising the cylinder 21, the piston 22 and the spring 23. The piston 22 is connected to the rocker 20 by means of a rod 24 having an eye portion 25 adapted to engage the pin 26 on the rocker. When it is desired to mesh the gear 18 with the gear 17, fluid pressure (preferably air) from any suitable source on the locomotive is introduced through the connection 27, whereupon the piston 22 will move upwardly and the gear 18 will move to the right. If it is desired to mesh the gear 19 with the gear 17, fluid pressure is admitted through the connection 28, whereupon the piston 22 will move downwardly and the gear 19 to the right. When the piston 22 reaches either its upward or downward limit of travel, it will expose the connection 37 and permit the operating fluid to pass out through the conduit 38 to the booster throttle operating mechanism 39, as will appear more clearly below. In either direction of movement, the piston 22, upon its return, will exhaust the pressure from the connection 37 through the annular passage 29, the communicating ducts 30, the longitudinal port 31 in the rod 24 and the exhaust ducts 32 which are located just above the eye portion 25. The particular motor device for operating the rocker 20 illustrated herein is more fully described in the copending application of Major T. Forker, No. 261,776, filed March 15, 1928.

The operating steam for the forward booster is brought back from the locomotive on the left hand side thereof through the conduit 33, and the steam for the rear booster is brought back on the right hand side of the locomotive through the conduit 34. The exhaust for the forward booster takes place through the conduit 35, and that for the rear booster through the conduit 36. It will be seen that these steam supply and exhaust connections come together at about the center of the tender and are located between the adjacent ends of the booster engines B, the arrangement being very simple and compact.

The controlling mechanism or system for the booster motors will now be described, reference being had particularly to Fig. 4. In this figure the various parts are shown in elevation and not in section, for the reason that as individual structures, they form no part of the present invention and are now quite well known to the art, having been in use in other booster combinations for some time and thoroughly illustrated in other patents and copending applications.

The fluid pressure for the controlling mechanism is introduced to the system through the pipe 38, and first reaches what is known as the reverse lever pilot valve D, the details of which form no part of the present invention, but which are fully illustrated, described and claimed in the copending application of Major T. Forker, No. 261,776, above referred to. Suffice it here to say that when the reverse lever 40 is moved into its forward corner (the position illustrated in Fig. 4), the fluid pressure can pass through the pilot valve D to the conduit 41 which has two branches 41a and 41b the former going to the forward booster and being coupled to the connection 27 previously described, and the latter to the connection 28 on the rear booster. It will thus be seen that when the large gear 18 on the forward booster is meshed with the gear 17 in order to drive the axle 2 forwardly, the small idler gear 19 on the rear booster is meshed with its axle gear 17 in order to drive the axle 5 in the same direction as the axle 2, namely, forwardly. After entrainment has taken place, the fluid pressure will pass out through the connections 37 and the conduits 38 to the booster throttles 39 already mentioned. The booster throttles will then be opened and steam will flow through the respective conduits 33 and 34 in order to drive the boosters. When the reverse lever 40 is moved to the rear corner (the corner opposite to the one shown in Fig. 4), the fluid is cut off from the pipe 41 and is delivered to the pipe 42, from whence it divides into the pipes 42a and 42b, the former going to the connection 28 on the forward booster in order to cause meshing of the gear 19 to drive the axle 2 in the reverse direction, and the latter going to the connection 27 on the rear booster in order to mesh the gear 18 of that booster with its gear 17 so as to drive its axle 5 in the reverse direction.

Valves 43 and 44 are provided, respectively, at the junction of the pipes 41, 41a and 41b, and the junction of the pipes 42, 42a and 42b, so that either one or both of the boosters may be utilized, or neither of them, as may be desired.

It is not believed to be necessary to describe the balance of the controlling mechanism, or to go into any further detail with respect to that portion of the mechanism already mentioned, since in and of itself it forms no part of the present invention and is referred to only to aid in disclosing the manner in which my improvements are applied.

I claim:

1. Locomotive booster equipment comprising in combination a pair of oppositely disposed normally disentrained booster engines and means for simultaneously entraining them to drive the locomotive in the direction desired.

2. The combination of a pair of axles, a normally disentrained booster engine for driving each axle, said booster engines being oppositely disposed, and means for entraining each booster engine to drive its axle in either direction.

3. The combination of a pair of axles, a normally disentrained booster engine for driving each axle, said booster engines being oppositely disposed, means for entraining each booster engine to drive its axle in either direction, and a controlling system for said boosters adapted to coordinate their operation to drive the locomotive in the same direction.

4. Locomotive booster equipment comprising in combination a pair of oppositely disposed uni-directional booster engines, a crank shaft for each engine, and means for correlatively entraining said crank shafts with the locomotive to drive it in the direction desired.

5. The combination of a pair of axles, a uni-directional booster engine for driving one of said axles, an oppositely disposed uni-directional booster engine for driving the other of said axles, mechanism capable of reversibly entraining each booster with its axle, and means for causing correlative entrainment of each booster to drive the locomotive in the direction desired.

6. Locomotive booster equipment comprising in combination with the locomotive reverse, a pair of oppositely disposed booster engines, and means entraining said boosters to drive the locomotive forwardly when said reverse is set for forward motion and to drive the locomotive rearwardly when said reverse is set for backward motion of the locomotive.

7. Locomotive booster equipment comprising in combination with a locomotive reverse, a pair of oppositely disposed uni-directional booster engines and means for correlatively entraining said booster engines to drive the locomotive forwardly when said reverse is set for forward motion and to drive the locomotive rearwardly when said reverse is set for backward motion of the locomotive.

8. In booster equipment for locomotives, the combination of a forward tender truck having a plurality of axles, a rear tender truck having a plurality of axles, a booster motor adapted to drive the rear axle of the forward truck and projecting rearwardly from said axle toward the rear truck, and a second booster motor adapted to drive the forward axle of the rear truck and projecting forwardly from said axle toward the forward truck.

9. In booster equipment for locomotives, the combination of a forward tender truck having a plurality of axles, a rear tender truck having a plurality of axles, a booster motor adapted to drive the rear axle of the forward truck and projecting rearwardly from said axle toward the rear truck, and a second booster motor adapted to drive the forward axle of the rear truck and projecting forwardly from said axle toward the forward truck, together with steam delivery and exhaust means between the adjacent ends of said booster.

10. In booster equipment for locomotives, the combination of a forward tender truck having a plurality of axles, a rear tender truck having a plurality of axles, a booster motor adapted to drive the rear axle of the forward truck and projecting rearwardly from said axle toward the rear truck, a second booster motor adapted to drive the forward axle of the rear truck and projecting forwardly from said axle toward the forward truck, and means connecting the booster driven axle of each truck to the other axles of said truck.

In testimony whereof I have hereunto signed my name.

MONTAGUE H. ROBERTS.